United States Patent
Murphey

[11] Patent Number: 6,124,244
[45] Date of Patent: Sep. 26, 2000

[54] CLEAR BRINE DRILL-IN FLUID

[75] Inventor: Joseph Robert Murphey, Spring, Tex.

[73] Assignee: Tetra Technologies Inc, The Woodlands, Tex.

[21] Appl. No.: 09/312,383

[22] Filed: May 14, 1999

Related U.S. Application Data

[60] Provisional application No. 60/031,262, Nov. 15, 1996.

[51] Int. Cl.⁷ ...................................................... C09K 7/02
[52] U.S. Cl. .......................... 507/111; 507/110; 507/120; 507/121; 507/122; 507/140; 507/145
[58] Field of Search ................................ 507/111, 110, 507/120, 121, 122, 140, 145

[56] References Cited

U.S. PATENT DOCUMENTS

| | | | |
|---|---|---|---|
| 3,956,141 | 5/1976 | Walker | 507/145 |
| 4,502,965 | 3/1985 | Giddings et al. | 252/8.5 |
| 4,502,966 | 3/1985 | Giddings et al. | 252/8.5 |
| 4,554,081 | 11/1985 | Borchardt et al. | 252/8.5 A |
| 4,619,773 | 10/1986 | Heilweil et al. | 252/8.514 |
| 4,678,591 | 7/1987 | Giddings et al. | 252/8.514 |
| 4,719,021 | 1/1988 | Branch, III | 507/111 |
| 4,743,383 | 5/1988 | Stewart et al. | 252/8.51 |
| 4,792,412 | 12/1988 | Heilweil | 252/8.514 |
| 5,480,863 | 1/1996 | Oakley et al. | 507/225 |
| 5,641,728 | 6/1997 | Dobson, Jr. et al. | 507/111 |
| 5,804,535 | 9/1998 | Dobson et al. | 507/111 |

FOREIGN PATENT DOCUMENTS

| | | | |
|---|---|---|---|
| 0331277A2 | 1/1989 | European Pat. Off. | C09K 7/02 |
| 0681017A1 | 5/1995 | European Pat. Off. | C09K 7/02 |
| 0728826A1 | 2/1996 | European Pat. Off. | C09K 7/02 |
| WO 9619544 | 6/1996 | European Pat. Off. | C09K 7/02 |
| 0758011A1 | 2/1997 | European Pat. Off. | C09K 7/02 |
| 2245294 | 1/1992 | United Kingdom | C09K 7/02 |

*Primary Examiner*—Philip Tucker
*Attorney, Agent, or Firm*—Jo Katherine D'Ambrosio

[57] ABSTRACT

A drilling fluid comprising a blend of brine and additives for maintaining rheological properties in a neutral or slightly acidic brine and a method for using the drilling fluid to drill into a producing formation are disclosed. The drilling fluid comprises viscosifying polymer and fluid loss polymer that function in the brine without substantially adversely affecting their properties. The brine is substantially free of insoluble solids. The viscosifying polymer and/or the fluid loss control polymer can be acid soluble. Zinc salts in the form of zinc bromide alone or in a mixture of zinc bromide and calcium bromide are added to increase the density of the brine solution. The viscosifying polymer has pendant amide and sulfonic acid or sulfonate groups. Alternatively or additionally, the viscosifying polymer comprises a polysaccharide. The fluid loss control polymer can comprise a cross-linked, cationic or amphoteric starch. Soluble solids are dispersed in the brine.

33 Claims, 3 Drawing Sheets

CLEAR BRINE DRILL-IN FLUID

CROSS-REFERENCE TO RELATED APPLICATIONS

This application claims the benefit of priority to international application PCT/US97/21173 filed Nov. 13, 1997 and provisional application 60/031,262 filed Nov. 15, 1996.

FIELD OF THE INVENTION

The present invention relates to a drilling fluid and method for drilling into a producing formation.

BACKGROUND OF THE INVENTION

Formulations of drilling fluids having the right properties are essential for drilling operations, particularly in the newer methods of drilling, working over, and completing wells. The effectiveness of a drilling fluid is measured by its characteristics: fluid density, viscosity, gel strength, fluid loss and contamination control. Additives are used to control these characteristics for the optimum performance of the drilling fluids. Drilling fluid additives, however, often create problems while improving necessary functions of the fluid. It has been proposed to use a clear brine as a drilling fluid, with the clear brine incorporating zinc salts to provide a high density. Maintaining a stable viscosity and fluid loss properties in an acidic environment can be problematic.

The problem of effective thickening of high salinity brines, particularly zinc bromide brines, has confronted the industry for almost two decades. Zinc-containing additives tend to acidify the brine. Conventional additives generally lose their effectiveness in an acidic environment. Viscosifying polymers, fluid loss control polymers, both natural and synthetic, as well as other additives were typically developed to work in high pH conditions. When zinc is added to raise the density, the resulting change in the pH can adversely alter the rheological properties of the drilling fluid. Moreover, because the required density of the brine is not always known beforehand, the drilling fluid additives must be able to function over a wider potential pH range than might actually be encountered in a single well.

The problem of maintaining the optimum characteristics of drilling fluids in an acidic environment has not been adequately addressed or solved by prior teachings. There is an unfulfilled need for a drilling fluid that maintains desired density, viscosity, gel strength and filter cake formation in neutral or slightly acidic brines.

Another pervasive problem with drilling fluids is that a log-log plot of viscosity versus shear rate usually results in a bow-shaped curve, rather than a straight line. This complicates and can introduce error into hydraulic calculations at different shear rates. It would be desirable to be able to use a drilling fluid with straight line rheology.

SUMMARY OF THE INVENTION

The inventors of the present invention have invented a way to viscosity and control the fluid loss properties of a drilling fluid which may contain zinc, e.g. a clear brine used to drill into a producing formation without significant damage to the producing formation which might otherwise result from using a drilling fluid conventionally weighted with bentonite and/or barite. It has been found that the clear brine drilling fluid can be viscosified using an acid soluble viscosifying polymer, such as an acrylamide/AMPS (2-acrylamido-2methylpropane-sulfonic acid polymerized with acrylic acid) copolymer and/or a polysaccharide, and can also be used with an acid soluble fluid loss control polymer, such as a cationic and/or amphoteric starch. It has also been found that certain combinations of viscosifying polymers and/or starches obtain synergistic viscosification and/or fluid loss properties when used in either zinc-containing or zinc-free brines.

Broadly, the invention provides a composition useful as a drilling fluid for drilling into a producing formation with limited formation damage. The composition includes a brine substantially free of insoluble solids, viscosifying polymer dispersed in the brine, and fluid loss control polymer dispersed in the brine. Preferably, the viscosifying polymer and/or the fluid loss control polymer are acid soluble. The brine can contain zinc, present as zinc bromide, zinc chloride or a combination thereof, to increase the density of the brine. The brine can also contain soluble solids, such as a finely divided carbonate, dispersed in the brine to facilitate fluid loss control. The brine can have a pH from 4.0 to 8.5.

In one embodiment, the viscosifying polymer has pendant amide and sulfonic acid or sulfonate groups. This polymer preferably comprises repeating units derived from an unsaturated amide having the formula of $CH_2=C(R)-C(O)-NH_2$ and a vinyl sulfur-containing compound selected from the group consisting of $CH_2=C(R)-SO_3M$, $CH_2=C(R)-R'SO_3M$, $CH_2=C(R)-R''-C(O)-NH-R'''-SO_3M$, $CH_2=C(R)-C(O)-NH-R'''-SO_3M$, and combinations thereof. In these formulas, M can be selected from the group consisting of hydrogen, alkali metals, and combinations thereof; R can be selected from the group consisting of hydrogen, hydrocarbon radicals having 1 to about 20 carbon atoms, and combinations thereof; and R', R'', and R''' are each independently selected from the group consisting of hydrocarbon including vinyl radicals having 1 to about 20 carbon atoms, and combinations thereof. The polymer can further comprise repeating units derived from acrylic acid, N-vinyl-pyrrolidone, N, N-dimethylacrylamide, dimethylaminoethylmethacrylate, methacrylamidopropyltrimethylammonium chloride or combinations thereof.

In another embodiment, the viscosifying polymer is a polysaccharide. The polysaccharide is preferably hydroxyethyl cellulose, xanthan gum, guar gum, wellan gum, succinoglycan, scleroglucan, carboxymethyl cellulose, hydroxypropyl guar gum, or the like.

In a preferred embodiment, the viscosifying polymer is a synergistic blend of the polysaccharide and the polymer having the pendant amide and sulfonic acid and/or sulfonate groups.

The fluid loss control polymer is preferably a starch. The starch is preferably cationic or amphoteric and can be cross-linked. Quaternized potato and corn starches can be used. When used with the polysaccharide, the starch preferably has from 0.005 to 0.8 cationic moieties per glucose moiety in the polysaccharide.

In another preferred embodiment, the present invention provides a drilling fluid having a substantially straight line rheology and comprising a brine having a pH from 4.0 to 8.5 substantially free of insoluble solids, xanthan gum dispersed in the brine, epichlorohydrin-cross linked quaternized starch dispersed in the brine, and a soluble solid dispersed in the brine. The brine can be zinc-free or comprise from 0.2 to 20 weight percent zinc present as zinc bromide, zinc chloride or a combination thereof. The starch preferably comprises from 0.005 to 0.8 cationic moieties per glucose moiety. The starch is preferably quaternized by reaction with a tertiary amine. The starch can be potato starch or corn starch. The soluble solid can be a finely divided carbonate.

In another aspect, the present invention also provides a method for drilling into a producing formation with limited formation damage. The method comprises the steps of: (a) drilling a bore hole into a formation adjacent to a producing formation; (b) circulating the composition described above in the bore hole; and (c) drilling into the producing formation while continuing step (b).

DETAILED DESCRIPTION

The preferred drilling fluid of the present invention is a blend of brine and additives that results in performance of Theological properties in a neutral or slightly acidic brine. The improved drilling fluid allows a viscosifying polymer and a fluid loss polymer to function within the brine without substantially adversely affecting their properties. Preferably, the viscosifying polymer and/or the fluid loss polymer are acid soluble. The brine is preferably substantially free of insoluble solids. Preferably, clear brines are used instead of conventional mud brines to reduce the permeability damage to a productive zone resulting from solids invasion of the formation matrix.

The salinity of the clear brine can be achieved by the use of any soluble salt such as, for example, calcium chloride, calcium bromide, zinc bromide, zinc chloride, sodium chloride, sodium formate, potassium formate, cesium formate, combinations thereof and the like. Zinc-containing salts are preferred to increase the density of the brine. A preferred density is within a range of from about 12 lbs/gal. to about 17.5 lbs/gal. Preferably, the composition of this invention comprises from 1 to 20 weight percent of zinc. When a zinc salt is used, the pH preferably is maintained within a range from 4.0 to 8.5.

Zinc is observed to have a beneficial effect when the fluid is subjected to cement contamination. Cement contamination of the drill-in fluid is inevitable when drilling a sidetrack of an existing well. A window is drilled through the casing and cement sheath of the well, and a second bore hole is drilled into the payzone. The occasion arises frequently, as it allows use of an existing well to reach additional reserves. Cement contamination can also occur from residual cement coating on the tubular goods through which the drill-in fluid flows. As the fluid is normally pumped after some of the well has been cemented, this possibility is also quite high.

Thickening of the preferred clear brine of the present invention is achieved by viscosifying polymers dispersed in the brine. The drilling fluid must provide support for solids under quiescent conditions, referred to as gel strength or low shear suspension. Preferably, the viscosifying polymer is an acid soluble polymer and has pendant amide and sulfonic acid or sulfonate groups. The term copolymer as used in the specification and claims includes any polymer made from two or more different monomers. The polymer preferably comprises a copolymer with repeating units derived from an unsaturated amide having the formula of $CH_2=C(R)-C(O)-NH_2$ and a vinyl sulfur-containing compound of $CH_2=C(R)-SO_3M$, $CH_2=C(R)-R'SO_3M$, $CH_2=C(R)-R''-C(O)-NH-R'''-SO_3M$, $CH_2=C(R)-C(O)-NH-R'''-SO_3M$, or a combination thereof. M is hydrogen, alkali metal or a combination thereof. R is hydrogen, hydrocarbon radical having 1 to about 20 carbon atoms, or a combination thereof. R', R'', and R''' are the same or different and each is a hydrocarbon including vinyl radical having 1 to about 20 carbon atoms or a combination thereof. The polymer can also include repeating units derived from acrylic acid, N-vinyl-pyrrolidone, N,N-dimethylacrylamide, dimethylaminoethylmethacrylate, methacrylamidopropyl-trimethylammonium chloride or a combination thereof. The preparation of these viscosifying copolymers is known to those in the art, and they are commercially available.

Alternatively or additionally, a drilling composition of this invention may include a polysaccharide as the viscosifying polymer. Polysaccharides include, for example, cellulose derivatives such as hydroxyethyl and/or carboxymethyl cellulose, and various gums such as xanthan gum, guar gum, wellan gum, succinoglycan, scleroglucan, hydroxypropyl guar gum, and the like, and the various combinations thereof. These biopolymers occur naturally although some, such as xanthan gum, are also available commercially from Rhone-Poulanc, under the trade name, RHODAPAL 23-P. It can be produced by the action of a plant pathogen, *Xanthomonas campestris*, on carbohydrates in a suitable medium. Xanthan gum solutions are preferred because of their superior shear-thinning properties The viscosifying polymer can also be a blend of a polysaccharide and the water soluble copolymers having pendant amide and sulfonic acid or sulfonate groups described above. These blends can have a synergistic effect on viscosification. When used as a blend, the amount of polysaccharide relative to the acylamide AA/AMPS (2-acrylamido-2methylpropane-sulfonic acid polymerized with acrylic acid) copolymer can vary over a wide range from 5:95 to 95:5 parts by weight, preferably from 15:85 to 90:10 parts by weight, and especially from 50:50 to 90:10 parts by weight.

The preferred fluid loss control polymer of the present invention comprises a cationic or amphoteric starch. Preferably, when used with the polysaccharide viscosifier, the starch has from 0.005 to 0.8 cationic moieties per glucose moiety. Although any starch with suitable fluid loss control properties can be used, we have found that corn and potato starches work well. Preferably, the starch is cross-linked to increase the molecular weight of the starch. The cross-linking can be achieved conventionally by reacting starch or starch derivatives with a cross-linking agent such as bifunctional etherifying and/or esterifying agents. Such agents include epichlorohydrin, β-β'-dichlorodiethyl ether, or dibasic organic acids reacted under conditions such that both carboxyl groups esterify starch hydroxyl groups. Other common cross-linking agents are trimetaphosphate, and linear mixed anhydrides of acetic and di- or tribasic carboxylic acids.

Cationic groups can be introduced into the starch to make it cationic or amphoteric by reacting the starch with a tertiary amine such as, for example, trimethyl amine (TMA) or diethanol aminoethanol (DEAE). One conventional method involves the simultaneous cooking and reaction of the starch at pH 8 with a monofunctional reagent such as β-diethylaminoethyl chloride. Many derivatizing agents require the preparation of epichlorohydrin-ammonia and/or amine condensates. Polymeric polyamine reagents have been prepared by the reaction of alkylene dihalides and amines and the reaction of poly(epichlorohydrin) with tertiary amines. The preferred cationic cross-linked starch in the present invention is preferably obtained by cross-linking with epichlorhydrin and quaternizing with from 0.1 to 0.8 moles of tertiary amine, either as TMA or DEAE, per mole of hydroxyl groups in the starch. A comprehensive description of the properties and methods of making various starches and starch derivatives may be found in *STARCH Chemistry and Technology*, 2nd Ed., Whistler et al., Academic Press (1984), pp. 325–332 and 354–364.

Soluble solids can be dispersed in the preferred brine of this invention to improve fluid loss properties. As used herein, soluble solids are understood to include solids which are soluble in water, hydrocarbons, and/or aqueous acid solutions. These can include water soluble salts when used in a brine saturated with that particular salt, acid soluble carbonates or organic materials that are later soluble in the produced hydrocarbon or in a solvent that can be injected later. Insoluble fines and solids formed in the actual drilling operation are always present and are damaging to permeability. This is particularly the case when drilling shale. The high density brines are referred to herein as clear brines even though they may include soluble solids and a relatively minor amount of insoluble solids which can be introduced by the drilling operation, either or both of which may make the brine appear not to be optically clear. The soluble solids are purposely added to the high density brines to dilute the damaging drilling solids in the volume of the mud cake. Properly selected soluble solids allow building of the final filter cake rapidly, thus limiting the total volume of fluid lost to the formation. Removal of the soluble filter cake later maximizes production. The proper selection of the size of soluble solids is well known to those skilled in the art. Preferably, in the composition of this invention, the soluble solids comprise a finely divided carbonate.

The preferred drilling fluid of the present invention can also contain additional additives conventionally present in drilling fluids, such as, for example, sequestering agents, surfactants, inert gases, corrosion inhibitors, emulsifying agents, friction reducers, or the like.

The preferred drilling fluid of the present invention is prepared by blending the various components together using conventional techniques and equipment known to those skilled in the art.

The preferred clear brine drilling fluids of the present invention are especially well-adapted for drilling into a producing formation when it is desired to avoid formation damage. The bore hole is drilled into a formation adjacent to a producing formation using conventional drilling fluids and procedures. The conventional drilling fluid will typically contain bentonite and/or barite suspended therein. Just before the formation containing the hydrocarbons to be produced is entered, the conventional drilling fluid is replaced by the preferred clear brine fluid of the present invention which is circulated to remove the conventional drilling fluid, along with the bentonite, barite or other formation-damaging materials. The drilling operation is then resumed while continuing to circulate the clear brine drilling fluid to drill the bore hole into the producing formation. In this manner, damage to the producing formation is largely avoided.

A preferred drilling fluid of this invention is particularly well-suited to applications in which cement contamination is possible or likely. The preferred zinc-containing drilling fluid of this invention is not substantially adversely affected by cement contamination which might occur when drilling a sidetrack of an existing well, for example. Thus, the present method can include drilling a window through the casing and cement sheath of the original bore hole, and then drilling a second bore hole into the producing formation.

The preferred high density clear brine of this invention can also be used as a completion or workover fluid, or in any other drilling operation calling for the use of a clear brine. As such, the fluid can be thickened as described above to reduce fluid loss to the formation, to transport gravel into place, or to help move debris from the hole.

EXAMPLES

Example 1

To demonstrate the effect of adding $ZnBr_2$ to a thickened fluid of calcium bromide, the following experiment was run. One fluid was prepared with 1.70 g/ml calcium bromide brine. Another was prepared from 2.39 g/ml calcium bromide/zinc bromide brine. The final density of both fluids was 1.49 g/ml (specific gravity 1.49). The formulations for these fluids were otherwise the same and are presented in Table 1.

TABLE 1

| Component | Fluid A (kg/cm$^3$) | Fluid B (kg/m$^3$) |
|---|---|---|
| Calcium bromide brine[1] (1.70 g/ml) | 893 | 1050 |
| Zinc bromide/calcium bromide brine[2] (2.39 g/ml) | 115 | 0 |
| Water | 392 | 350 |
| Xanthan[3] (Rhodapal 23P) | 3.57 | 3.57 |
| Mixed AAm/AMPS polymers[4] | 11.4 | 11.4 |
| Derivatized starch[5] | 11.4 | 11.4 |
| Sodium thiosulfate[6] | 2.85 | 2.85 |
| Powdered marble[7] | 85.6 | 85.6 |

[1]54 wt % $CaBr_2$
[2]56 wt % $ZnBr_2$
[3]Rhodapal 23P obtained from Rhone-Poulanc
[4]U.S. Pat. No. 4,752,404; obtained from Phillips Petroleum Company
[5]Epichlorohydrin cross-linked hydroxypropyl corn starch
[6]Reagent grade
[7]Calcium carbonate from Marble Falls, 4–400 µm The calcium bromide solution was a commercial solution available from several suppliers. It was 54 percent by weight calcium bromide. The zinc bromide/calcium bromide was 56 percent by weight zinc bromide, 23 percent by weight calcium bromide, and was a commercial product. Consequently, the zinc percentage in Fluid A was 1.1 percent by weight.

The xanthan was a commercial product available from Rhone-Poulanc, Rhodapal 23-P. The mixed polymers were described in U.S. Pat. No. 4,752,404 and obtained commercially from Phillips Petroleum Company. The derivatized starch was an epichlorohydrin cross-linked, hydroxypropyl derivatized starch. A reagent grade sodium thiosulfate was used. The powdered marble was a blend of commercial products of calcium carbonate from Marble Falls, 4 µm to 400 µm in size.

The materials were mixed together in the order listed. After addition of the starch, the mixture was heated to 60° C. before adding the rest of the materials. Each ingredient was completely mixed in before adding the next. The rheology was measured using an OFI (Houston, Tex.) Model 800 Rheometer, which is a Fann type rheometer. From the measured rheology data, the plastic viscosity (PV), yield point (YP), and the power law constants, n' and k', were calculated as described in Darley et al., *Composition and Properties of Drilling and Completion Fluids,* 5th ed., Chapter 5. After taking rheologies of the mixtures at 48.9° C., the blends were hot-rolled overnight at 93.3° C. for 16 hours. At this time, rheologies were checked again and a standard API fluid loss test was run. The results are given in Table 2.

TABLE 2

|  | Fluid A | | Fluid B | |
| --- | --- | --- | --- | --- |
| RPM | Before Hot Rolling | After Hot Rolling | Before Hot Rolling | After Hot Rolling |
|  | Apparent Viscosity (cp) | | | |
| 600 | 150 | 208 | 174 | 212 |
| 300 | 106 | 149 | 128 | 155 |
| 200 | 87 | 122 | 104 | 127 |
| 100 | 61 | 83 | 73 | 88 |
| 60 | 47 | 63 | 55 | 66 |
| 30 | 32 | 41 | 36 | 43 |
| 6 | 12 | 14 | 12 | 14 |
| 3 | 9 | 9 | 8 | 8 |
|  | Other Properties | | | |
| 10 second gel (dynes/cm$^2$) | 9 | 9 | 8 | 8 |
| 10 minute gel (dynes/cm$^2$) | 11 | 12 | 8 | 11 |
| PV (cp) | 44 | 59 | 46 | 57 |
| YP (kg/m$^2$) | 3.03 | 4.39 | 4.00 | 4.78 |
| n' | 0.555 | 0.620 | 0.611 | 0.618 |
| k' | 4.36 | 4.36 | 4.5 | 5.25 |
| API Fluid Loss (ml) | 1.0 | 2.0 | 1.7 | 1.0 |

When the data is potted on a log-log scale, the slope is n' and the intercept at 1 is k'. The systems with zinc before and alter hot rolling obtain log-log plots with straight lines—indicative of a true power law system in which n' stays constant over the entire interval. This means that hydraulic calculations based upon n' will be accurate over the entire interval. A bow shape in the log-log plot is the case for the systems without zinc.

Example 2

A series of tests was run similar to that in Example 1 in which the amount of 2.39 g/ml mixed ZnBr$_2$/CaBr$_2$ was varied from 5 to 9 percent by volume of the final mixture, keeping the fluid density at 1.49 g/ml. The fluids were otherwise prepared with the same components and procedures as in Example 1. The percentage of elemental zinc over this range was 1.1 to 2.0 weight percent.

TABLE 3

| Component | Fluid C (kg/m$^3$) | Fluid D (kg/m$^3$) | Fluid E (kg/m$^3$) | Fluid F (kg/m$^3$) | Fluid G (kg/m$^3$) |
| --- | --- | --- | --- | --- | --- |
| Calcium bromide brine[1] (1.7 g/ml) | 873 | 839 | 807 | 776 | 745 |
| Zinc bromide/calcium bromide brine[2] (2.39 g/ml) [vol %] | 114 [5] | 137 [6] | 163 [7] | 185 [8] | 208 [9] |
| Water | 399 | 408 | 417 | 425 | 434 |
| Xanthan[3] (Rhodapal 23P) | 4.99 | 5.99 | 5.99 | 5.99 | 5.99 |
| Mixed AAm/AMPS polymers[4] | 12.8 | 12.8 | 12.8 | 12.8 | 12.8 |
| Derivatized starch[5] | 11.4 | 7.1 | 7.1 | 7.1 | 7.1 |
| Sodium thiosulfate[6] | 2.85 | 2.85 | 2.85 | 2.85 | 2.85 |
| Powdered marble[7] | 99.9 | 99.9 | 99.9 | 99.9 | 99.9 |

TABLE 3-continued

| Component | Fluid C (kg/m$^3$) | Fluid D (kg/m$^3$) | Fluid E (kg/m$^3$) | Fluid F (kg/m$^3$) | Fluid G (kg/m$^3$) |
| --- | --- | --- | --- | --- | --- |
| Zinc content (wt %) | 1.1 | 1.35 | 1.55 | 1.8 | 2.0 |

The properties are same as notes to Table 1. The rheologies of the above fluids were measured as in Example 1. The results are presented in Table 4

TABLE 4

| RPM | Fluid C | Fluid D | Fluid E | Fluid F | Fluid G |
| --- | --- | --- | --- | --- | --- |
|  | Apparent Viscosity (cp) | | | | |
| 600 | 181 | 231 | 284 | 321 | 280 |
| 300 | 121 | 156 | 192 | 237 | 210 |
| 200 | 95 | 125 | 155 | 202 | 178 |
| 100 | 63 | 86 | 108 | 154 | 133 |
| 60 | 47 | 66 | 84 | 126 | 106 |
| 30 | 32 | 46 | 60 | 95 | 77 |
| 6 | 12 | 20 | 27 | 47 | 31 |
| 3 | 8 | 14 | 20 | 36 | 21 |
|  | Other Properties | | | | |
| 10 second gel strength (dynes/cm$^2$) | 8 | 14 | 20 | 34 | 21 |
| 10 minute gel strength (dynes/cm$^2$) | 9 | 15 | 20 | 34 | 22 |
| PV (cp) | 60 | 75 | 92 | 84 | 70 |
| YP (kg/m$^2$) | 2.98 | 3.95 | 4.88 | 7.47 | 6.84 |
| n' | 0.555 | 0.521 | 0.485 | 0.407 | 0.46 |
| k' | 4.85 | 7.83 | 11.51 | 23.76 | 16.05 |
| API Fluid Loss (ml) | 1.4 | 1.7 | 1.3 | 1.9 | 1.1 |

The viscosification with xanthan, mixed AA/AMPS copolymers and starch was seen to peak at about 1.8 weight percent zinc. The effect of the zinc concentration can most clearly be seen in the 10 second and 10 minute gel strengths.

Example 3

The following experiment was run to determine the stability of a 1.49 g/ml zinc-containing formulation when exposed to cement contamination. A direct comparison to a 1.49 g/ml brine formulated without zinc was run. The fluid compositions are presented in Table 5, and were prepared using the components and procedures as described in Example 1.

TABLE 5

| Component | Fluid H (kg/m$^3$) | Fluid I (kg/m$^3$) |
| --- | --- | --- |
| Calcium bromide brine[1] (1.70 g/ml) | 893 | 1070 |
| Zinc bromide/ calcium bromide brine[2] (2.39 g/ml) | 115 | 0 |
| Water | 392 | 330 |
| Xanthan[3] (Rhodapal 23 P) | 3.57 | 3.57 |
| Mixed AAm/AMPS polymers[4] | 11.4 | 11.4 |
| Derivatized starch[5] | 11.4 | 11.4 |
| Sodium thiosulfate[6] | 2.85 | 2.85 |
| Anionic polymer for fluid loss[7] | 14.3 | 14.3 |
| Magnesium oxide | 2.85 | 2.85 |
| Powdered marble[8] | 85.6 | 85.6 |

The fluids were then contaminated with wet, API Class H cement at 0, 14.3 and 28.5 kg m$^3$, and the rheological properties and pH's determined. The results are presented in Table 6.

TABLE 6

| | Fluid H (No zinc) | | | Fluid I (1.1 wt % zinc) | | |
|---|---|---|---|---|---|---|
| Wet Cement added (kg/m³) | 0 | 14.3 | 28.5 | 0 | 14.3 | 28.5 |
| RPM | Apparent Viscosity (cp) | | | | | |
| 600 | 212 | 200 | 157 | 174 | 180 | 184 |
| 300 | 155 | 135 | 102 | 128 | 130 | 134 |
| 200 | 127 | 115 | 78 | 104 | 106 | 109 |
| 100 | 88 | 65 | 49 | 73 | 74 | 75 |
| 60 | 66 | 48 | 35 | 55 | 56 | 57 |
| 30 | 43 | 30 | 22 | 36 | 37 | 38 |
| 6 | 14 | 12 | 8 | 12 | 13 | 15 |
| 3 | 8 | 7 | 6 | 8 | 9 | 10 |
| Other Properties | | | | | | |
| PV (cp) | 57 | 65 | 55 | 46 | 50 | 50 |
| YP (kg/m²) | 4.8 | 3.4 | 2.3 | 4.0 | 3.9 | 4.1 |
| 10 sec & 10 min Gel strengths (dynes/cm²) | 8 & 11 | 7 & 9 | 6 & 6 | 8 & 8 | 10 & 12 | 10 & 20 |
| PH | 7 | 9.8 | 10.3 | 7 | 6.8 | 6.7 |

The rheological properties are seen to change relatively little when the zinc is present. Without the zinc, the gel strengths and yield points fall, while the plastic viscosities increase. Higher plastic viscosities require greater pumping pressures. Lower gel strengths increase the chance of solids settling during quiescence. Lower yield points mean poorer capacity to clean the hole. Thus, the changes in every case where zinc is not used are undesirable.

Example 4

An example of a cationic synthetic polymer suitable for viscosifying a zinc-containing solution is available commercially under the trade designation Acid Gellant #1107 from Champion Chemicals Special Products. An example of a cationic starch suitable for fluid loss control is a potato starch that has been cross-linked with epichlorohydrin, similar to the cross-linked potato starch available commercially under the trade designation EXSTAR W from Chemstar Products Co., and then quaternized with trimethylamine. These materials were used in the following test in a 2.1 g/ml fluid system and compared to fluids prepared with the mixed polymers of Example 1 and an anionic fluid loss control polymer instead of the cationic synthetic polymer. The concentration of zinc in all formulations, chosen to achieve the desired final density, was 17.6 volume percent. The composition of these fluids is presented in Table 7.

TABLE 7

| Component | Fluid J (kg/m³) | Fluid K (kg/m³) | Fluid L (kg/m³) |
|---|---|---|---|
| Zinc bromide/calcium bromide brine² (2.39 g/ml) | 1830 | 1830 | 1830 |
| Water | 168 | 168 | 168 |
| Xanthan³ (Rhodapal 23P) | 4.28 | 4.28 | 4.28 |
| Derivatized starch⁵ᵃ | 13.1 | 13.1 | 13.1 |
| Sodium thiosulfate⁶ | 5.7 | 5.7 | 5.7 |
| Magnesium oxide | 8.6 | 8.6 | 8.6 |
| Powdered marble⁷ | 100 | 100 | 100 |
| Cationic synthetic polymer⁸ | 2.8 | 0 | 0 |
| Mixed AA/AMPS polymers⁴ | 0 | 2.8 | 0 |
| Anionic fluid loss polymer⁹ | 0 | 0 | 2.8 |

TABLE 7-continued

| Component | Fluid J (kg/m³) | Fluid K (kg/m³) | Fluid L (kg/m³) |
|---|---|---|---|

⁵ᵃTrimethylamine-quaternized EXSTAR W epichlorohydrin-cross-linked potato starch
⁸Acid Gellant #1107 obtained from Champion Chemicals
⁹Obtained commercially under the trade designation DRISCAL
Notes are as according to Table 1.

The rheological and fluid loss properties were evaluated as in Example 1 and are presented in Table 8.

TABLE 8

| RPM | Fluid J | Fluid K | Fluid L |
|---|---|---|---|
| Apparent Viscosity (cp) | | | |
| 600 | 268 | 283 | 198 |
| 300 | 185 | 188 | 134 |
| 200 | 151 | 148 | 106 |
| 100 | 112 | 103 | 73 |
| 60 | 86 | 80 | 53 |
| 30 | 66 | 57 | 35 |
| 6 | 33 | 24 | 13 |
| 3 | 26 | 16 | 8 |
| Other Properties | | | |
| 10 second gel (dynes/cm²) | 19 | 16 | 7 |
| 10 minutes gel (dynes/cm²) | 23 | 20 | 9 |
| PV (cp) | 83 | 95 | 64 |
| YP (kg/m²) | 4.98 | 4.54 | 3.42 |
| n' | 0.382 | 0.489 | .600 |
| k' | 18.00 | 10.80 | 4.57 |
| API Fluid Loss (ml) | 0.0 | 0.0 | 0.0* |

While the nature and amount of the synthetic acid thickening polymer is changed in each of the entries, it should be noted that xanthan and a cationic starch are components of each of the formulations, and that these will provide viscosification according to the present invention without the synthetic polymers. A straight line rheology was obtained for Fluid L when the only synthetic anionic polymer present was the lower molecular weight DRISCAL polymer. Furthermore, it is seen from the rheology of Fluid L that the xanthan polysaccharide and cationic starch provide a synergistic viscosification when no other viscosifying agents are present.

Example 5

The following two tests demonstrate a broad range of densities over which the invention may be practiced. The range of densities above about 1.44 g/ml and less than 2.10 g/ml are known as being troublesome to formulate. The polymer must provide sufficient suspending capabilities because the density between the carbonate solids and the brine is still significant. Yet in this brine density range, polymer functionality has been variable. This is an alternative formulation using the xanthan polymer of earlier examples, the cationic starch, but without any anionic fluid loss polymers. The compositions were prepared as in Example 1 and are presented in Table 9.

TABLE 9

| Component | Fluid M (kg/m³) | Fluid N (kg/m³) |
|---|---|---|
| Calcium bromide brine¹ (14.2 lbs/gal) | 245 | 245 |

TABLE 9-continued

| Component | Fluid M (kg/m³) | Fluid N (kg/m³) |
|---|---|---|
| Zinc bromide/Calcium bromide brine² (19.2 lbs/gal) | 1670 | 1670 |
| Water | 100 | 100 |
| Xanthan³ (Rhodapal 23P) | 3.4 | 3.4 |
| Mixed AAm/AMPS polymers⁴ | 1.9 | 1.9 |
| Derivatized starch | 13.7[5a] | 13.7[5b] |
| Sodium thiosulfate⁶ | 5.7 | 5.7 |
| Magnesium oxide | 11 | 11 |
| Powdered marble⁸ | 86 | 30 |

Notes are according to Table 1 except as follows:
[5a]Epichlorohydrin cross-linked trimethylamine quaternized potato starch
[5b]A hydroxypropyl modified cross-linked starch as described in U.S. Pat. No. 4,822,500

The fluids were tested as in Example 1, and the rheological and fluid loss properties are presented in Table 10.

TABLE 10

| RPM | Fluid M | Fluid N |
|---|---|---|
| Apparent Viscosity (cp) | | |
| 600 | 167 | 248 |
| 300 | 114 | 162 |
| 200 | 90 | 127 |
| 100 | 60 | 86 |
| 60 | 45 | 65 |
| 30 | 31 | 44 |
| 6 | 12 | 17 |
| 3 | 8 | 11 |
| Other Properties | | |
| 10 second gel (dynes/cm²) | 7 | 10 |
| 10 minutes gel (dynes/cm²) | 8 | 12 |
| PV (cp) | 53 | 86 |
| YP (kg/m²) | 3.2 | 3.7 |
| n' | 0.54 | 0.56 |
| k' | — | — |
| API Fluid Loss, high pressure and temperature (ml) | 32 | 29 |

A log-log plot of the rheological data also shows that the fluids maintain a straight line rheology.

Example 6

The following tests were run using calcium bromide, calcium chloride and zinc bromide brines. For specific tests calcium chloride and/or zinc bromide were left out. Table 11 represents the formulation of 1.56 g/ml drill-in fluids based upon $CaBr_2$ and $CaCl_2$ brines.

TABLE 11

| Component | Fluid O (kg/m³) | Fluid P (kg/m³) | Fluid Q (kg/m³) | Fluid R (kg/m³) | Fluid S (kg/m³) |
|---|---|---|---|---|---|
| Calcium bromide (1.70 g/ml) | 556.6 | 879.9 | 1004 | 1209 | 1208 |
| Calcium chloride (1.39 g/ml) | 657.6 | 483.9 | 0 | 0 | 0 |
| Zinc bromide/calcium Bromide Brine 2.30 g/ml | 149 | 0 | 149 | 0 | 0 |
| Xanthan polymer water | 99 | 99 | 309.6 | 254 | 251 |
| Xanthan liquid (Flozan) | 6.0/2.4 | 6.0/2.4 | 6.0/2.4 | 6.0/2.4 | 6.0/2.4 |
| Starch[5a] | 13.7 | 13.7 | 13.7 | 13.7 | 13.7 |
| Mixed AAM/AMPS polymers, #1 | 3.4 | 3.4 | 3.4 | 3.4 | 3.4 |
| Sodium thiosulfate | 2.8 | 2.8 | 2.8 | 2.8 | 2.8 |
| Magnesium oxide | 5.7 | 5.7 | 5.7 | 5.7 | 5.7 |

TABLE 11-continued

| Component | Fluid O (kg/m³) | Fluid P (kg/m³) | Fluid Q (kg/m³) | Fluid R (kg/m³) | Fluid S (kg/m³) |
|---|---|---|---|---|---|
| Powdered marble | 91 | 91 | 91 | 91 | 91 |

All components are similar to those used in earlier tests. In particular, the mixed AA/AMPS polymers and the derivatized cationic starch are the same as those described in Table 9 above. Quantities are based upon 350 cc volume units—the so called 'lab barrel'. All entries are in grams, and the final total volume in each case amounts to 350 ml of fluid, having a specific gravity of 1.56 (546 g). Table 12 presents the rheological properties of 1.56 g/ml fluid systems based upon calcium chloride, calcium bromide and zinc bromide. Initial rheology and rheology after 16 and 48 hours of hot rolling at 65.6° C., 93.3° C. and 121.1° C. were checked, as well as standard high pressure-high temperature fluid loss tests for 4 hours. Table 13 presents data after 24 hours and 48 hours at 93.3° C. Table 14 presents data after 24 hours and 48 hours at 121.1° C. Table 15 presents similar data for Fluid S.

TABLE 12

| RPM | Fluid O (cp) | Fluid P (cp) | Fluid Q (cp) | Fluid R (cp) | Fluid S (cp) |
|---|---|---|---|---|---|
| 600 | 106 | 112 | 111 | 102 | 101 |
| 300 | 74 | 77 | 75 | 75 | 65 |
| 200 | 61 | 62 | 61 | 62 | 52 |
| 100 | 43 | 42 | 43 | 46 | 37 |
| 60 | 33 | 31 | 33 | 37 | 30 |
| 30 | 23 | 21 | 26 | 27 | 23 |
| 6 | 11 | 9 | 11 | 16 | 13 |
| 3 | 9 | 7 | 8 | 12 | |
| Other Properties | | | | | |
| PV (cp) | 32 | 35 | 36 | 27 | 36 |
| YP (kg/m²) | 2.1 | 2.1 | 1.9 | 2.3 | 1.4 |
| 10 second gel (dynes/cm²) | 9 | 7 | 9 | 13 | 12 |
| 10 minute gel (dynes/cm²) | 11 | 8 | 11 | 16 | 13 |
| API Fluid Loss 30 min/cc | 1.4 | 1.6 | 1 | 1.4 | N.R. |
| 1 hr HPHT Fluid Loss, cc's | 15.2 | 13.6 | 12.4 | 12 | N.R. |

TABLE 13

| | Fluid O (cp) | Fluid P (cp) | Fluid Q (cp) | Fluid R (cp) | Fluid O (cp) | Fluid P (cp) | Fluid Q (cp) | Fluid R (cp) |
|---|---|---|---|---|---|---|---|---|
| RPM | | | | | | | | |
| Aged Data | Hot Rolled 24 hrs. at 93.3° C. | | | | Hot Rolled 48 hrs. at 93.3° C. | | | |
| 600 | 136 | 145 | 90 | 91 | 136 | 155 | 89 | 67 |
| 300 | 92 | 99 | 66 | 67 | 90 | 104 | 62 | 48 |
| 200 | 74 | 79 | 55 | 56 | 74 | 83 | 51 | 39 |
| 100 | 52 | 55 | 39 | 41 | 52 | 58 | 37 | 28 |
| 60 | 41 | 43 | 31 | 32 | 42 | 45 | 30 | 22 |
| 30 | 30 | 31 | 22 | 24 | 31 | 33 | 22 | 15 |
| 6 | 15 | 16 | 11 | 12 | 15 | 16 | 9 | 6 |
| 3 | 12 | 12 | 8 | 9 | 12 | 12 | 7 | 4 |
| Other Properties | | | | | | | | |
| PV (cp) | 44 | 46 | 24 | 24 | 46 | 51 | 27 | 19 |
| YP (kg/m²) | 2.3 | 2.6 | 2.1 | 2.1 | 2.1 | 2.6 | 1.7 | 1.4 |

TABLE 13-continued

| | | | | | | | | |
|---|---|---|---|---|---|---|---|---|
| 10 second gel (dynes/cm$^2$) | 11 | 12 | 8 | 9 | 10 | 10 | 7 | 5 |
| 10 minute gel (dynes/cm$^2$) | 13 | 16 | 9 | 11 | N.R. | N.R. | N.R. | N.R. |
| API Fluid Loss 30 min/cc | 1.8 | 1.2 | 2.5 | 3.4 | 1.8 | 0.6 | 1.0 | 2.6 |
| 1 hr HPHT (ml) | 12 | 10.8 | 17.2 | 16 | 12 | 10 | 16 | 12.4 |

TABLE 14

| RPM | Fluid O (cp) | Fluid P (cp) | Fluid Q (cp) | Fluid R (cp) | Fluid O (cp) | Fluid P (cp) | Fluid Q (cp) | Fluid R (cp) |
|---|---|---|---|---|---|---|---|---|
| Aged Data | Hot Rolled 24 hrs. at 121.1° C. | | | | Hot Rolled 48 hrs. at 121.1° C. | | | |
| 600 | 68 | 131 | N.R. | 100 | 40 | 129 | 30 | |
| 300 | 43 | 89 | N.R. | 71 | 22 | 86 | 17 | 86 |
| 200 | 32 | 71 | N.R. | 58 | 15 | 70 | 12 | 48 |
| 100 | 20 | 50 | N.R. | 42 | 9 | 48 | 8 | 33 |
| 60 | 12 | 38 | N.R. | 33 | 6 | 37 | 5 | 25 |
| 30 | 8 | 26 | N.R. | 24 | 3 | 26 | 3 | 17 |
| 6 | 3 | 12 | N.R. | 10 | 2 | 11 | 2 | 7 |
| 3 | 3 | 9 | N.R. | 8 | 1 | 8 | 2 | 7 |
| Other Properties | | | | | | | | |
| PV (cp) | 25 | 42 | N.R. | 29 | 14 | 43 | 13 | 26 |
| YP (kg/m$^2$) | 0.88 | 2.3 | N.R. | 2.1 | 0.2 | 2.1 | 0.2 | 1.7 |
| 10 second gel (dynes/cm$^2$) | 3 | 9 | N.R. | 8 | 1 | 9 | 1 | 8 |
| 10 minute gel (dynes/cm$^2$) | N.R. | N.R. | N.R. | N.R. | N.R. | N.R. | N.R. | N.R. |
| API Fluid Loss 30 min/cc | 5.0 | 2 | N.R. | 2.4 | N.R. | 0.6 | N.R. | 2.0 |
| 1 hr HPHT Fluid Loss, cc's | 13.2 | 15.2 | N.R. | 20.8 | N.R. | 15.2 | N.R. | 18 |

TABLE 15

| RPM | Fluid S (cp) | |
|---|---|---|
| Aged Data | Hot Rolled 24 hrs. at 121.1° C. | Hot Rolled 48 hrs. at 121.1° C. |
| 600 | 91 | 84 |
| 300 | 65 | 58 |
| 200 | 54 | 54 |
| 100 | 41 | 36 |
| 60 | 34 | 30 |
| 30 | 27 | 23 |
| 6 | 16 | 13 |
| 3 | 14 | 11 |
| Other Properties | | |
| PV (cp) | 26 | 26 |
| YP (kg/m$^2$) | 1.9 | 1.6 |
| 10 second gel (dynes/cm$^2$) | 15 | 11 |
| 10 minute gel (dynes/cm$^2$) | 16 | 11 |
| API Fluid Loss 30 min/cc | 1.0 | 1.4 |
| 1 hr HPHT Fluid Loss, cc's | 8.8 | 9.6 |

Example 7

The following tests were run using a clear brine with and without zinc viscosified with a combination or xanthan gum and epichlorohydrin-crosslinked, quaternized potato starch. Table 16 represents the formulation of drill-in fluids based on NaBr, CaBr$_2$ and CaBr$_2$/ZnBr$_2$.

TABLE 16

| Component | Fluid T | Fluid U | Fluid V |
|---|---|---|---|
| Sodium bromide brine (12.5 lbs/gal) | 66.8 vol % | 0 | 0 |
| Calcium bromide brine[1] (14.2 lbs/gal) | 0 | 56 vol % | 52.28 vol % |
| CaBr$_2$/ZnBr$_2$ (19.2 lbs/gal) | 0 | 0 | 25 vol % |
| Water | 27.3 vol % | 40.7 vol % | 19.35 vol % |
| Magnesium Oxide | 2 lbs/bbl | 2 lbs/bbl | 0 |
| Zinc Oxide | 0 | 0 | 2 lbs/bbl |
| Xanthan[3] | 1 lb/bbl | 1.25 lbs/bbl | 1.1 lbs/bbl |
| Derivitized Starch[5a] | 4.8 lbs/bbl | 4.8 lbs/bbl | 4.8 lbs/bbl |
| Sodium thiosulfate[6] | 1 lb/bbl | 1 lbs/bbl | 1.5 lbs/bbl |
| Anhydrous Calcium Bromide | 80 lbs/bbl | 0 | 0 |
| Powdered marble[7] | 30 lbs/bbl | 32 lbs/bbl | 32 lbs/bbl |

All components were similar to those used in earlier tests. The rheologies of the above fluids were measured as in Example 1 with some exceptions. Visca Knoll drill solids (30 lbs/bbl) were added to Fluid T and it was hot rolled at 120° F. for 8 hours. Fluid U was hot rolled at 215° F. for 16 hours. Fluid V was hot rolled at 185° F. for 48 hours. The rheological data are presented in Table 17.

TABLE 17

| RPM | Fluid T | Fluid U | Fluid V |
|---|---|---|---|
| Apparent Viscosity (cp) | | | |
| 600 | 64 | 76 | 89 |
| 300 | 42 | 55 | 64 |
| 200 | 33.5 | 45 | 52 |
| 100 | 23 | 31 | 39 |
| 60 | | 26 | 32 |
| 30 | | 19 | 24 |
| 6 | 4.5 | 9 | 13 |
| 3 | 3 | 7 | 10 |
| Other Properties | | | |
| 10 second gel (dynes/cm$^2$) | 3.5 | 9 | 10 |
| 10 minute gel strength (dynes/cm$^2$) | 5 | 13 | 10 |
| PV (cp) | 22 | 21 | 25 |
| YP (lb/100 ft$^2$) | 20 | 34 | 39 |

Figure 1:
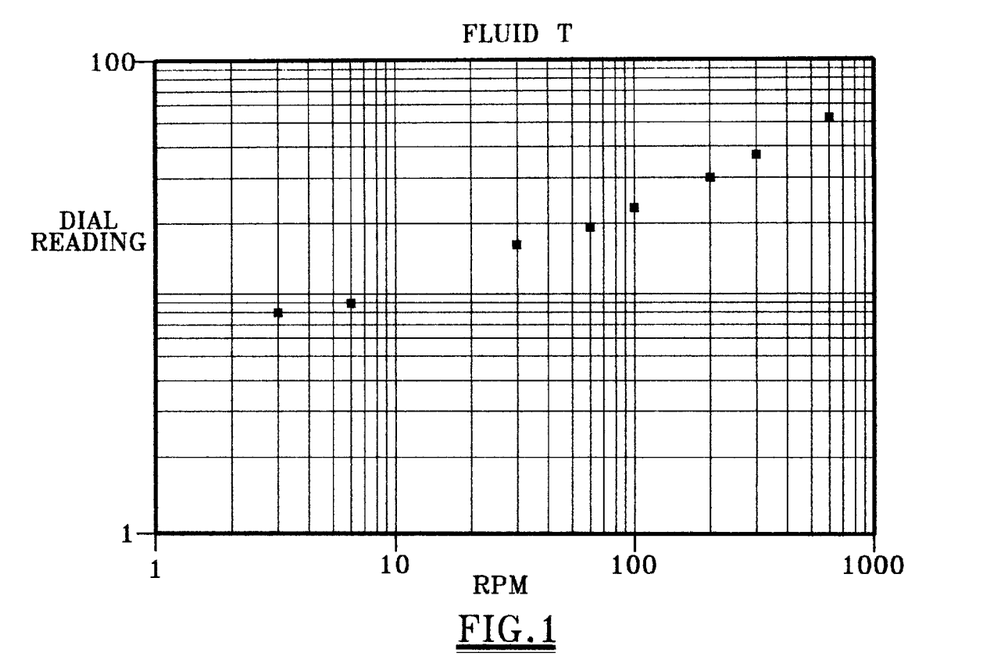
FIG. 1 is a log-log plot of the viscosity versus shear rate of Fluid T in Example 7 below.
Figure 2:
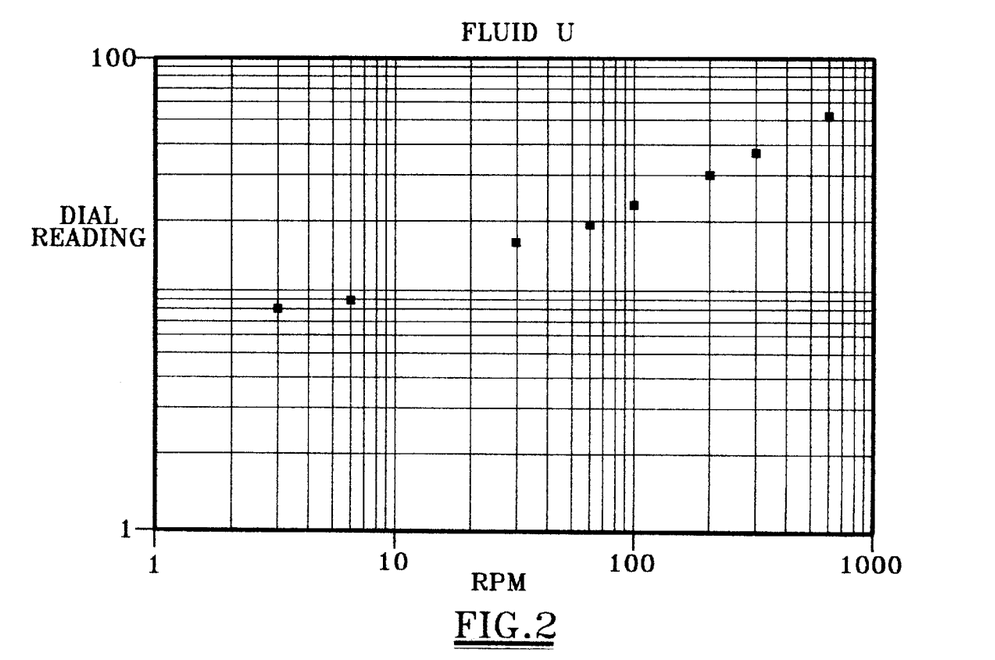
FIG. 2 is a log-log plot of the viscosity versus shear rate of Fluid U in Example 7 below.
Figure 3:
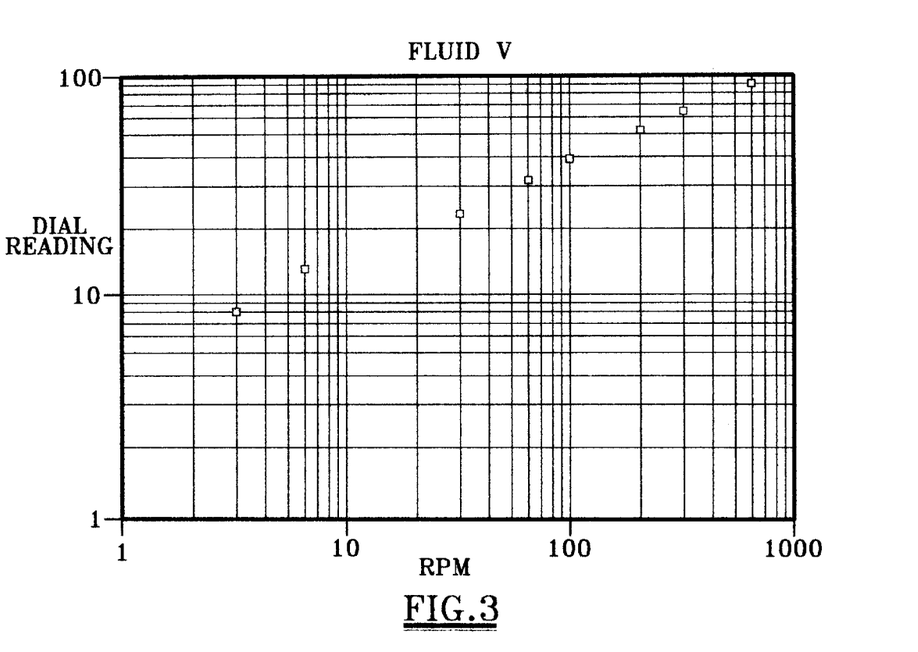
FIG. 3 is a log-log plot of the viscosity versus shear rate of Fluid V in Example 7 below.

The rheological data for Fluids T, U and V are also presented in the log-log plots in FIGS. 1–3. It is seen that n' (slope) stays generally constant over the entire interval. A severe bow shape in the log-log plot is generally the case for systems without zinc and/or based on other viscosifying polymers.

Comparative Example

The procedure of Example 7 was repeated using a calcium bromide brine with xanthan gum or quaternized starch as the sole "viscosifiers". Fluid W contained 52.8 volume percent calcium bromide brine (14.2 lbs/gal), 44.3 volume percent water, 1 lb/bbl sodium thiosulfate, 1 lb/bbl xanthan gum, and 32 lbs/bbl sized calcium carbonate. Fluid X contained 4.8 lbs/bbl quaternized epichlorohydrin-crosslinked starch and no xanthan gum, but was otherwise the same as Fluid W. Both Fluid W and Fluid X were hot rolled for 48 hours at 185° F. before rheological testing. Fluid properties are presented in Table 18.

TABLE 18

| RPM | Fluid W | Fluid X |
|---|---|---|
| Apparent Viscosity (cp) | | |
| 600 | 26 | 6 |
| 300 | 21 | 3 |
| 200 | 18 | 2 |
| 100 | 14 | 2 |
| 60 |  | 2 |
| 30 |  | 2 |
| 6 | 8 | 0 |
| 3 | 6 | 0 |
| Other Properties | | |
| 10 second gel strength (dynes/cm$^2$) | 10 | 10 |
| 10 minute gel strength (dynes/cm$^2$) | 10 | 10 |
| PV (cp) | 25 | 25 |
| YP (lb/100 ft$^2$) | 39 | 39 |

Figure 4:
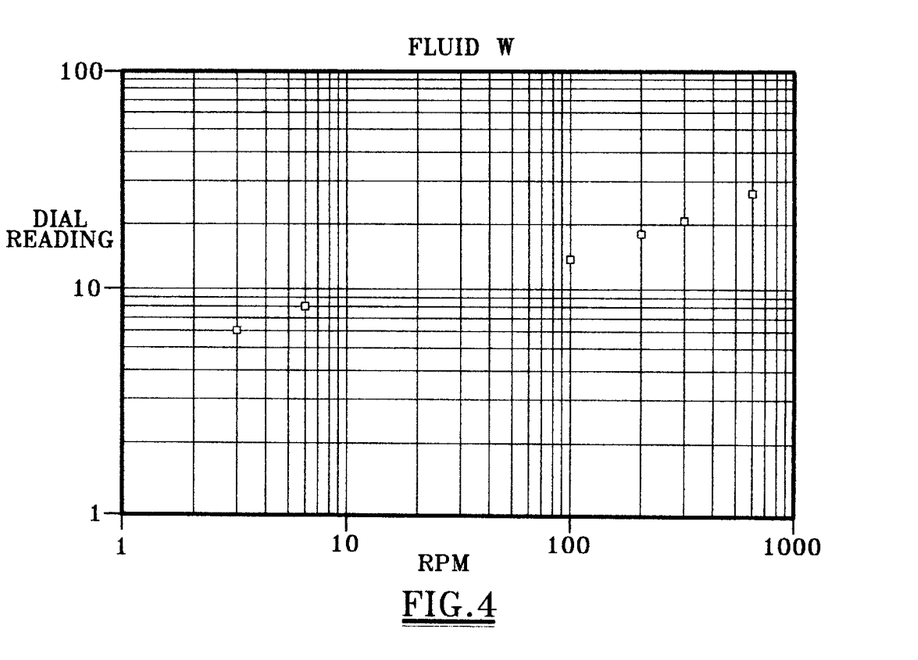
FIG. 4 is a log-log plot of the viscosity of Fluid W in the Comparative Example below.
Figure 5:
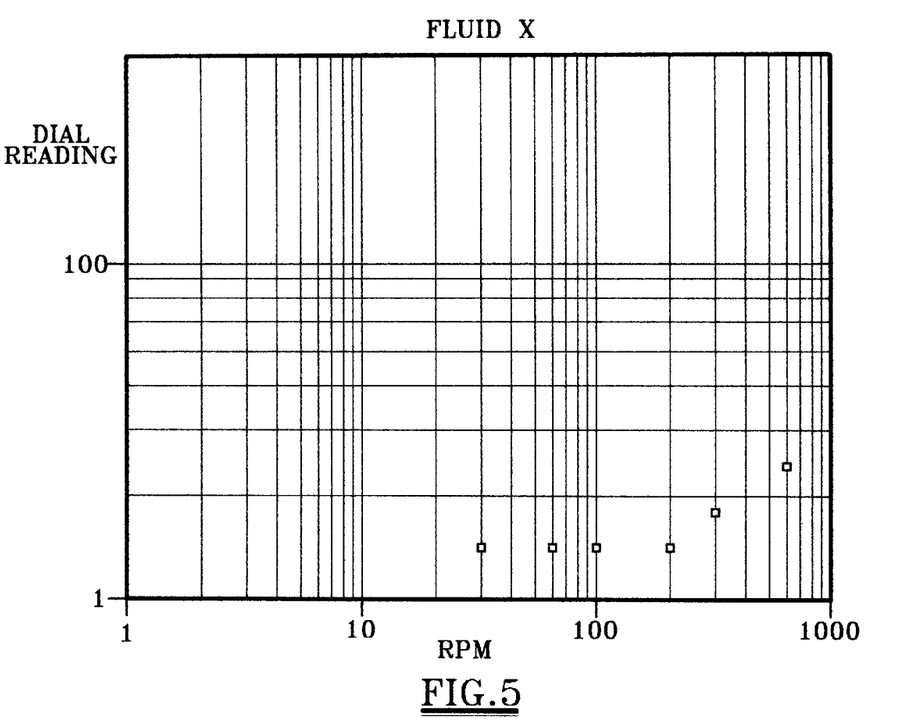
FIG. 5 is a log-log plot of the viscosity of Fluid X in the Comparative Example below.

The viscosity versus shear rate data are presented in FIGS. 4 and 5 for Fluids W and X. It is seen that both xanthan alone (Fluid W) and quaternized starch alone (Fluid X) provide little viscosification and result in very non-linear log-log rheology plots. It is, thus, very surprising to obtain synergistic viscosification and straight line rheology when the epichlorohydrin-crosslinked quaternized starch and xanthan gum are used together as seen in Example 7 (Fluids T, U and V).

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A drilling fluid, comprising:
   a zinc-containing brine having a pH from 4.0 to 8.5 and substantially free of insoluble solids;
   a polymer having pendant amide and sulfonic acid or sulfonate groups dispersed in the brine;
   a cationic or amphoteric starch dispersed in the brine; and
   a soluble undissolved, finely divided solid dispersed in the brine.

2. The composition of claim 1 comprising from 0.2 to 20 weight percent of zinc.

3. The composition of claim 1 wherein the zinc is present as zinc bromide, zinc chloride or a combination thereof.

4. The composition of claim 1 wherein the polymer comprises repeating units derived from an unsaturated amide having the formula of $CH_2=C(R)—C(O)—NH_2$ and a vinyl sulfur-containing compound selected from the group consisting of $CH_2=C(R)—SO_3M$, $CH_2=C(R)-R'SO_3M$, $CH_2=C(R)-R''—C(O)—NH-R'''—SO_3M$, $CH_2=C(R)—C(O)—NH—R'''—SO_3M$, and combinations thereof; M is selected from the group consisting of hydrogen, alkali metals, and combinations thereof; R is selected from the group consisting of hydrogen, hydrocarbon radicals having 1 to about 20 carbon atoms, and combinations thereof; and R', R'', and R''' are each selected from the group consisting of hydrocarbon including vinyl radicals having 1 to about 20 carbon atoms, and combinations thereof.

5. The composition of claim 4 wherein the polymer further comprises repeating units derived from acrylic acid, N-vinyl-pyrrolidone, N,N-dimethylacrylamide, dimethylaminoethylmethacrylate, methacrylamidopropyl-trimethylammonium chloride or combinations thereof.

6. The composition of claim 1 wherein the starch comprises from 0.005 to 0.8 cationic moieties per glucose moiety.

7. The composition of claim 1 wherein the starch is cross-linked.

8. The composition of claim 1 wherein the starch is corn starch or potato starch.

9. The composition of claim 1 wherein the soluble solid comprises a carbonate.

10. A drilling fluid, comprising:
    a zinc-containing brine having a pH from 4.0 to 8.5 and substantially free of insoluble solids;
    xanthan gum dispersed in the brine;
    a cationic or amphoteric starch dispersed in the brine; and
    a soluble undissolved, finely divided solid dispersed in the brine.

11. The composition of claim 10 comprising from 0.2 to 20 weight percent of zinc.

12. The composition of claim 11 wherein the zinc is present as zinc bromide, zinc chloride or a combination thereof.

13. The composition of claim 10 wherein the starch comprises from 0.005 to 0.8 cationic moieties per glucose moiety in the polysaccharide.

14. The composition of claim 10 wherein the starch is cross-linked.

15. The composition of claim 10 wherein the starch is corn starch or potato starch.

16. The composition of claim 10 wherein the soluble solid comprises a carbonate.

17. A drilling fluid, comprising:
    a zinc-containing brine having a pH from 4.0 to 8.5 and substantially free of insoluble solids;
    a polymer having pendant amide and sulfonic acid or sulfonate groups dispersed in the brine;
    a polysaccharide dispersed in the brine;
    a cationic or amphoteric starch dispersed in the brine; and
    a soluble undissolved, finely divided solid dispersed in the brine.

18. The composition of claim 17 comprising from 0.2 to 20 weight percent of zinc.

19. The composition of claim 18 wherein the zinc is present as zinc bromide, zinc chloride or a combination thereof.

20. The composition of claim 17 wherein the polymer comprises repeating units derived from an unsaturated amide having the formula of $CH_2=C(R)—C(O)—NH_2$ and a vinyl sulfur-containing compound selected from the group consisting of $CH_2=C(R)—SO_3M$, $CH_2=C(R)-R'SO_3M$, $CH_2=C(R)-R''—C(O)—NH—R'''—SO_3M$, $CH_2=C(R)—C(O)—NH—R'''—SO_3M$, and combinations thereof; M is selected from the group consisting of hydrogen, alkali metals, and combinations thereof; R is selected from the group consisting of hydrogen, hydrocarbon radicals having 1 to about 20 carbon atoms, and combinations thereof; and R', R'', and R''' are each selected from the group consisting of hydrocarbon vinyl radicals having 1 to about carbon atoms, and combinations thereof.

21. The composition of claim 20 wherein the polymer further comprises repeating units derived from acrylic acid, N-vinyl-pyrrolidone, N,N-dimethylacrylamide, dimethylaminoethylmethacrylate, methacrylamidopropyl-trimethylammonium chloride or a combination thereof.

22. The composition of claim 17 wherein the polysaccharide is selected from the group consisting of hydroxyethyl cellulose, xanthan gum, guar gum, wellan gum, succinoglycan, scleroglucan, carboxymethyl cellulose, hydroxypropyl guar gum, and combinations thereof.

23. The composition of claim 17 wherein the starch provides from 0.005 to 0.8 cationic moieties per glucose moiety in the polysaccharide.

24. The composition of claim 17 wherein the starch is cross-linked.

25. The composition of claim 17 wherein the starch is corn starch or potato starch.

26. The composition of claim 17 wherein the soluble solids comprise a carbonate.

27. A drilling fluid having a substantially straight line rheology and comprising:
- a brine having a pH from 4.0 to 8.5 and substantially free of insoluble solids;
- xanthan gum dispersed in the brine;
- an epichlorohydrin-crosslinked quaternized starch dispersed in the brine; and
- a soluble undissolved, finely divided solid dispersed in the brine.

28. The drilling fluid of claim 27 wherein the brine comprises from 0.2 to 20 weight percent zinc present as zinc bromide, zinc chloride or a combination thereof.

29. The drilling fluid of claim 27 wherein the starch comprises from 0.005 to 0.8 cationic moieties per glucose moiety.

30. The drilling fluid of claim 27 wherein the starch is quaternized by reaction with a tertiary amine.

31. The drilling fluid of claim 27 wherein the starch comprises potato starch or corn starch.

32. The drilling fluid of claim 27 wherein the soluble solid comprises a carbonate.

33. A method for drilling into a producing formation with limited formation damage comprising the steps of:
- (a) drilling a bore hole into a formation adjacent to a producing formation;
- (b) circulating the drilling fluid or composition of any one of claims 1–32 in the bore hole; and
- (c) drilling into the producing formation while continuing step (b).

* * * * *